Dec. 19, 1967   H. L. PINKERTON ET AL   3,358,739
APPARATUS FOR CONCENTRATING SOLUTIONS
Filed March 7, 1966   3 Sheets-Sheet 1
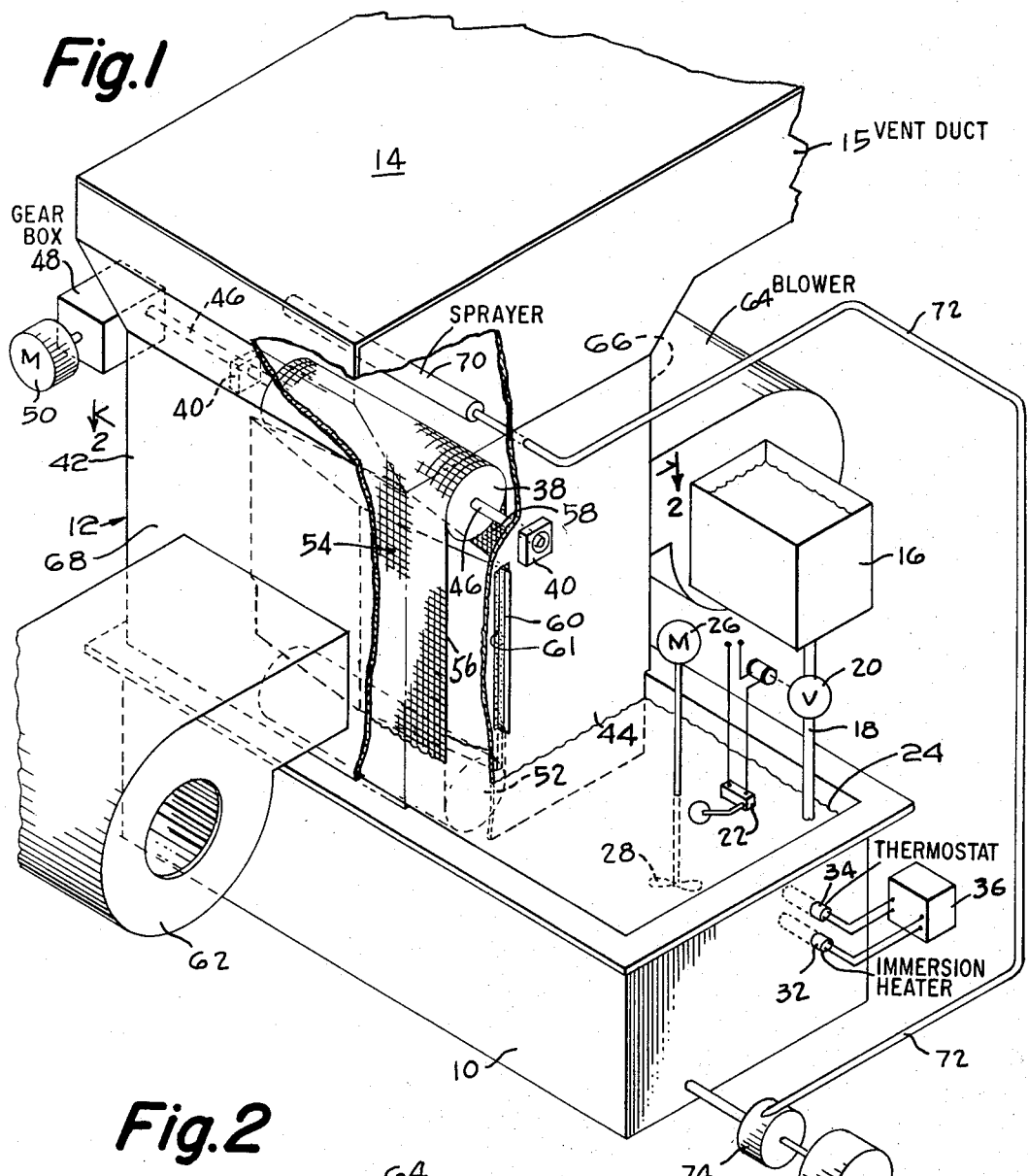
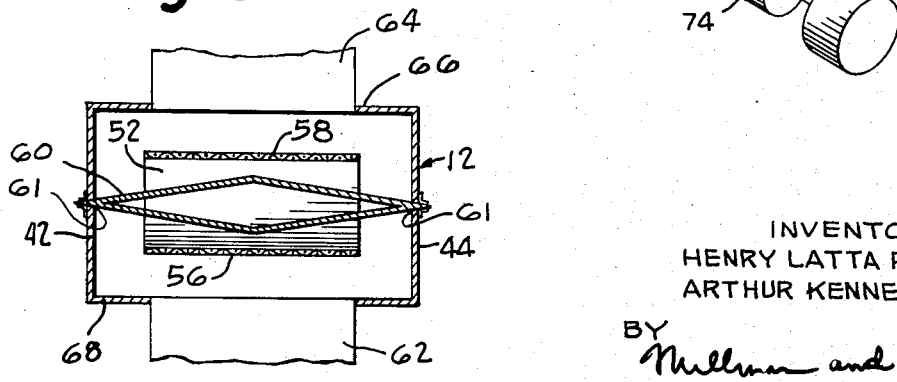
INVENTORS
HENRY LATTA PINKERTON
ARTHUR KENNETH GRAHAM
BY *Millman and Jacobs*
ATTORNEYS

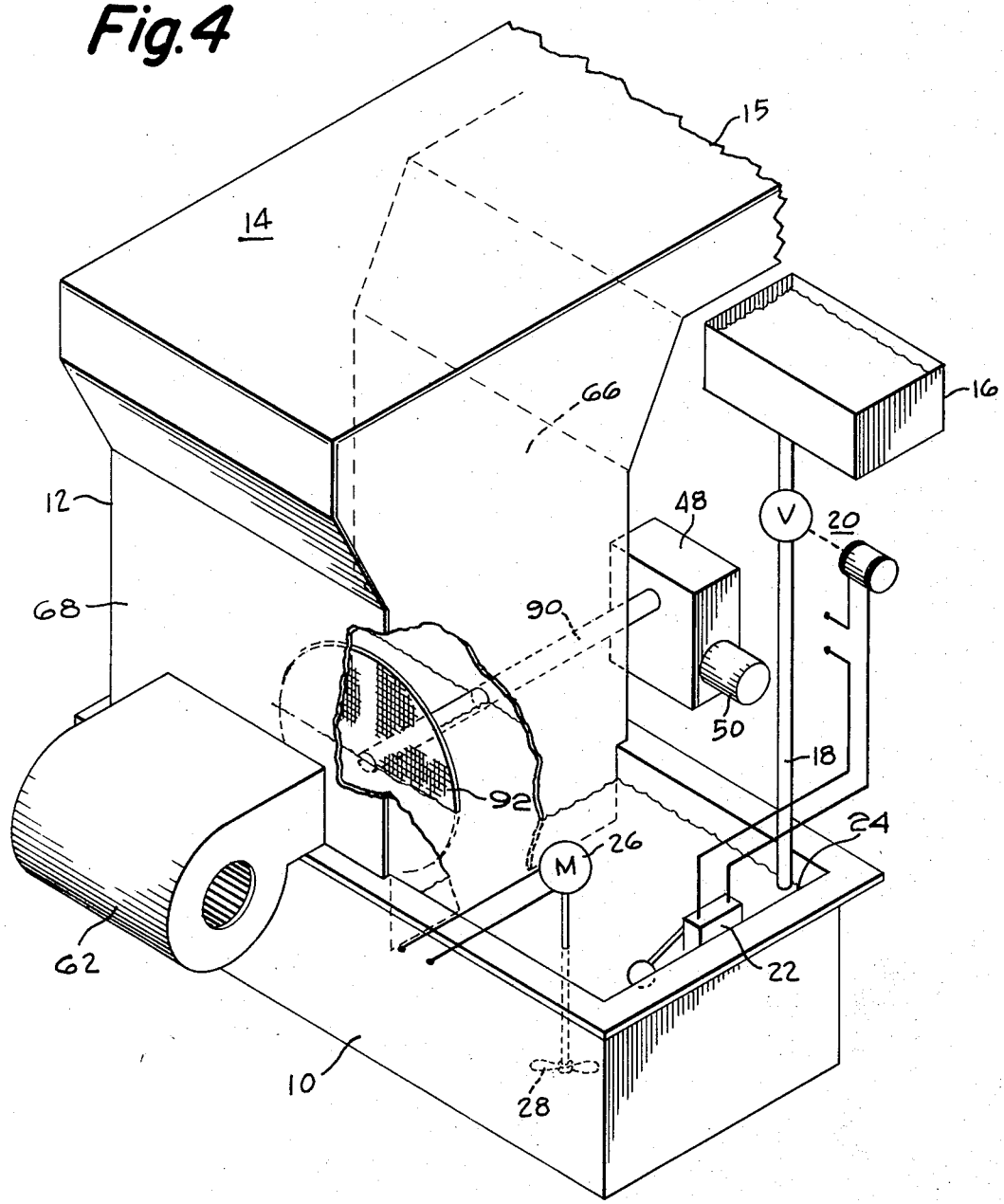

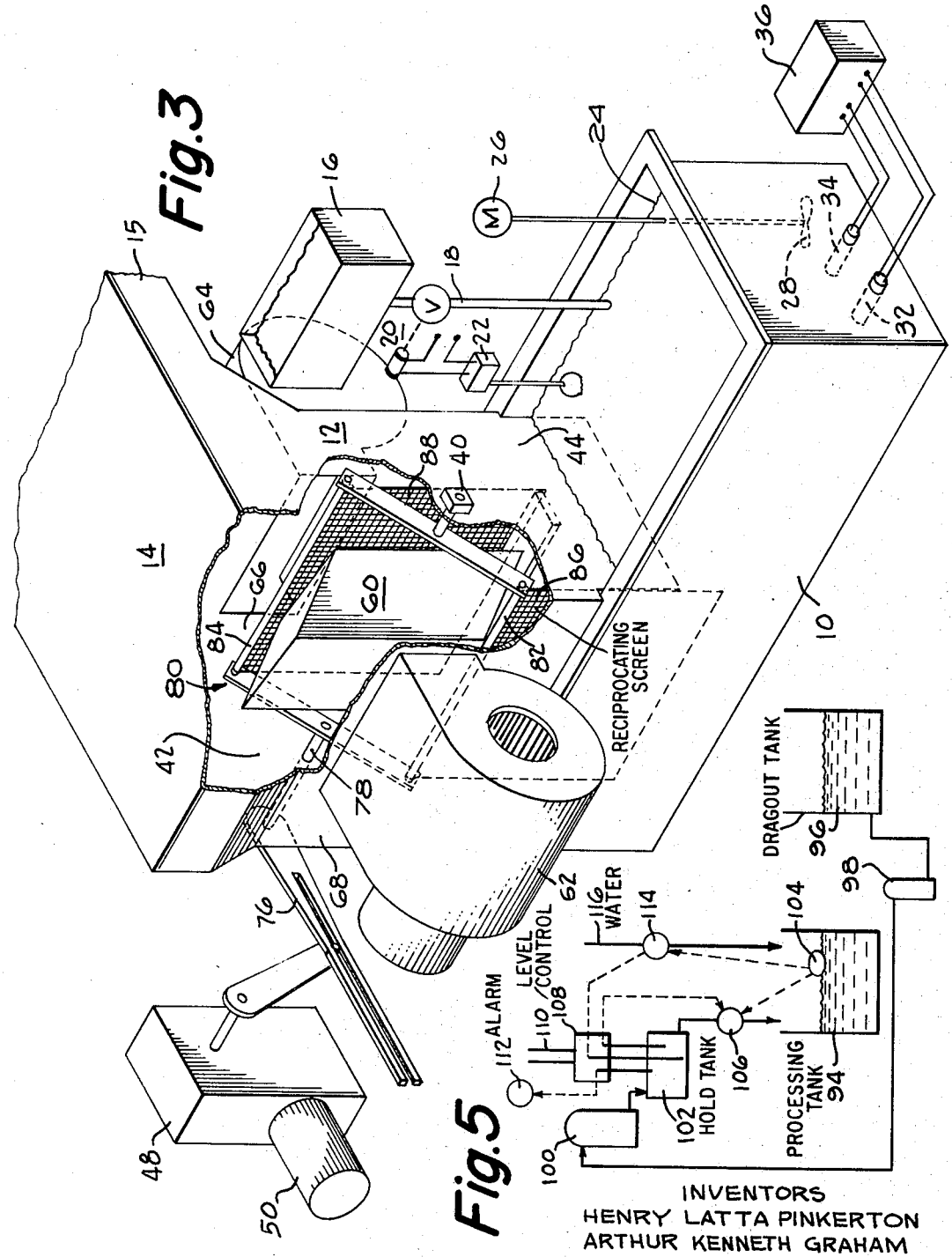

United States Patent Office 3,358,739
Patented Dec. 19, 1967

3,358,739
APPARATUS FOR CONCENTRATING SOLUTIONS
Henry Latta Pinkerton, Hatboro, and Arthur Kenneth Graham, Jenkintown, Pa., assignors to Graham, Savage & Associates, Inc., Jenkintown, Pa., a corporation of Illinois
Filed Mar. 7, 1966, Ser. No. 532,408
3 Claims. (Cl. 159—8)

This invention relates to a method and apparatus of concentrating dilute solutions to a more desirable higher concentration, especially solutions of a sensitive, dangerous or corrosive nature.

Heretofore, two general types of apparatus were employed to effect such concetration. One involved conventional evaporators in single or multiple effects, operated at normal or reduced pressures. The other involved the use of a vertical column or tower packed with solid objects, such as Berl saddles or other irregularly shaped objects, operated by trickling the preheated dilute solution through the column while a stream of air is passed up through the column.

There are several disadvantages to the aforementioned equipment. One is the cost of the equipment maintenance and operation, especially when the solutions treated are corrosive such as chromium plating solutions. Another is that in the vertical column or tower operation a relatively large tower must be used to obtain a large area of the packing material. Thus, a large and expensive blower is required to deliver air vertically upward through the tower. Also, the velocity of the air is limited to prevent it from blowing the solution out through the air exit. This, plus the height of the tower, creates long contact time during which the air becomes increasingly saturated with the evaporating vapor as it rises, thereby decreasing the evaporation rate. The tower method also inherently possesses the disadvantage that the falling liquid, being cooled during evaporation, is at its coolest temperature at the lowest end of the tower where it contacts the driest incoming air, whereas it should be at its warmest temperature.

The primary object of the invention is to provide a method and apparatus of concentrating liquids which overcomes the disadvantages which reside in conventional single and multiple effect evaporators and towers noted above.

Another object of the invention is to effect the efficient recovery of valuable solutions at full or near full strength, especially those solutions used in electroplating and related operations which have been carried out of the processing tank by the workpieces and their holders or carriers and which have been rinsed therefrom. The instant invention is particularly applicable to the concentration of the process solutions rinsed from the workpieces carried in a rotating barrel in the manner set forth in our copending application Ser. No. 501,079, filed Oct. 22, 1965.

A further object of the invention is to provide a method and apparatus for efficiently reducing the quantity of chemicals in the solutions normally going to waste, thereby effecting savings in the amount and cost of chemicals required to treat the waste.

An important feature of the invention is to provide an easily operable concentrator employing an air pervious member as a means to continuously or intermittently withdraw portions of the solution to be concentrated from a vessel and to subject the thus wetted surface of the air pervious member to a forced air current at a position beyond the liquid level and thereby cause efficient evaporation of the solution. For the continuous operation, the air pervious member may be an endless screen, i.e. wire mesh, perforate flexible belt, woven fabric and the like, entrained over rotatable, vertically spaced rollers, one of which is immersed in the solution while the other is mounted above the liquid level to provide an ascending flight of the screen which acts to withdraw by wetting of its surface portions of the solution from the vessel and to present the thus wetted surface to the forced air current. To improve efficiency, means may be provided to pump solution from the vessel and spray it on either or both of the screen flights while subjecting it to the forced air current.

These and other objects and features of the invention will become apparent as the following description proceeds in conjunction with the accompanying drawings, wherein:

FIG. 1 is a perspective and partly diagrammatic view of one embodiment of the invention;

FIG. 2 is a planar sectional view taken on the line 2—2 of FIG. 1;

FIG. 3 is a view similar to FIG. 1 of a second embodiment of the invention;

FIG. 4 is a view similar to FIG. 1 of yet another embodiment of the invention; and FIG. 5 is a diagrammatic view of apparatus employing the present concentrator in a phase of the plating or metal finishing process.

Specific reference is now made to the drawings in which similar reference characters are used for corresponding elements throughout.

The rate of evaporation of surface-type evaporators operated at atmospheric pressure is a direct function of solution temperature and vapor pressure, total exposed surface area of the solution, relative velocity of the surface and the atmosphere and total volume of air contracting the surface in a given time. It is an inverse function of solution concentration and degree of saturation of the atmosphere contacting the solution surface. Accordingly, in the ideal surface evaporator a large quantity of dry air should be brought continuously into brief, high-velocity contact with a large surface of the very hot dilute solution and the air instantly removed and replaced with fresh large quantities of dry air.

These conditions do not prevail in vertical column or tower type evaporators since the air rising up through the packing is limited in velocity, the contact time is long because of the need for a large high tower, the air becomes saturated with the evaporating vapor as it rises, and the falling liquid is coolest at the bottom of the tower, rather than hottest, when it contacts incoming drier air. In addition, such towers and the required accessories are very expensive, especially when designed to handle corrosive solutions, such as chromium plating solutions.

The present invention approaches the ideal surface evaporator thus overcoming these disadvantages by providing for the continuous or intermittent movement into and out of a solution, maintained at a desired liquid level and heated to a predetermined temperature, of an air pervious member, subjecting the air pervious member and solution wetting it to a current of forced relatively dry air when the member is beyond the liquid level and providing for immediate removal of the air laden with evaporated vapor and its replacement with relatively dry air.

Referring first to FIG. 1, a tank 10 is provided of suitable shape and construction which includes a vertically extending open-top evaporator housing portion 12, preferably towards one end thereof, which communicates with a chamber 14 of larger cross-sectional area to reduce velocity and thus to return splashes, condensates and sprays to the tank prior to discharge into a suitable vent duct 15.

A reservoir 16 delivers fresh hot dilute solution to the tank via a conduit 18 with a solenoid valve 20 therein.

A conventional float switch 22 is operatively connected to valve 20, whereby said hot dilute solution is delivered by gravity to the tank to a desired liquid level 24 and so continually maintained at or close to said level by the operation of said solenoid valve 20. A motor 26 drives an agitator 28 continuously, thereby assuring uniformity of both the temperature and the concentration of the solution within the tank 10. Heat is supplied to the solution in the tank by immersion heater 32 operated by immersion thermostat 34 and control 36. Heat is supplied to the reservoir 16 and controlled in a similar manner.

An upper cylindrical roll 38 is positioned in the housing 12 adjacent its upper end and is rotatably mounted in suitable bearings 40 on the end walls 42 and 44 of the housing 12 via a shaft or pintles 46. The cylinder is operatively connected via a gear box 48 to a motor 50. A lower cylindrical roll 52 is immersed in the solution. An air pervious member in the form of an endless screen 54, i.e. wire mesh, perforate flexible belt, woven fabric and the like, is entrained over both rolls. Any suitable means may be provided to retain the lower roll immersed in the solution and to apply tension to the screen member. One such means may be weights applied to the lower roll. The desirable extent to which the screen is immersed in the solution is small so that the greatest practical area of wetted screen may be available for useful evaporation.

It will thus be seen that the screen member has an ascending flight 56 and a descending flight 58. Between them and the rolls 38 and 52 is a deflector plate 60, which extends laterally beyond the side edges of the screen member, is preferably diamond shaped in horizontal cross-section to direct the flow of moisture laden air laterally away from the screen, and which is appropriately supported by any suitable means as by passing through slots 61 in the walls 42 and 44, it being understood that a tape may be used around the slots to effect an air seal. The deflector acts to prevent conflict of the opposing flows of air between the flights 56 and 58 which pass through the flights.

Air blowers 62 and 64 are positioned so that they open through the opposite sides 66 and 68 of the housing 12 to deliver a current of forced relatively dry air against the ascending and descending flights 56 and 58 of the screen member above the liquid level 24 of the solution.

Thus, as the screen member 54 rotates, the ascending flight 56 continuously carries portions of the heated solution on its wetted surface out of the tank and the blast of air from the blower 62 causes the solvent to vaporize. The air laden with vapor impinges on the deflector, laterally goes out the side openings between the flights and the rolls and up between the ends of the screen member and the end walls 42 and 44, and upwardly to the exhaust vent duct 15, while the more concentrated solution thus formed on the screen is carried back into the tank.

Since the process of rapid evaporation removes a very considerable quantity of heat from the solution wetting the screen, the thus-carried solution is rapidly cooled. In certain cases also, the screen may become dry. To improve the efficiency of operation, therefore, it is desirable that one or more sprayers 70 be provided, mounted within the housing 12 by any suitable means and at any desirable location or locations opposite ascending flight 56 and/or descending flight 58. A conduit 72 with a pump 74 therein connects the bottom of the tank 10 with the sprayer 70. Thus, ascending and/or descending flights 56 and 58 may be supplied intermittently or continuously with heated solution, thus preventing any premature drying of the flights and thus also increasing the temperature of the solution carried by the flights, thereby greatly increasing the evaporative rate.

Although less efficient, the solution may be concentrated by eliminating the immersion of the lower roll in the solution and effecting the wetting of the screen entirely by spraying.

The modification shown in FIG. 3 is similar to that of FIGS. 1 and 2 but differs therefrom with respect to the fact that the screen member oscillates vertically rather than rotates as an endless member. Thus, the motor 50 via the gear box 48 rotates pivoted links 76 which are connected at one end to a shaft 78 that extends through the housing 12 and is journaled in its end walls 42 and 44. The shaft centrally mounts a preferably rectangular frame member 80 made of interconnected rods from the opposite side rods 82 and 84 of which are suspended air pervious members in the form of mesh plates or screen members 86 and 88. Thus, as the member 80 oscillates, one screen member 86 is immersed in solution while the other is raised at least partially out of it and vice versa, at which point a blast of air passes through the screen member to vaporize the solvent as previously described. The deflector plate 60 may be eliminated by providing a single blower and branch ducts opening to opposite sides of the screen members 86 and 88 wherein the ducts are opened and closed synchronously with the raising and lowering of the screen members. Thus, if screen member 86 is raised the blower will blow relatively dry air through it while the duct opposite screen member 88 is closed to delivery of air and vice versa.

The modification of FIG. 4 is yet another variation and differs from that of FIGS. 1 and 2 with respect to the nature of the air pervious or screen member. Thus, the motor 50 via gear box 48 drives a shaft 90 which extends through an end wall 66 of the housing 12 and terminates substantially in the center thereof where it mounts a disc 92 of mesh or screen construction. The position of the disc is preferably such that as it turns almost fifty percent of the disc area dips into the hot solution in the tank and when it leaves the solution, i.e. extends beyond the liquid level, it is subjected to a blast of air from the blower 62 to vaporize the solvent wetting the disc, as previously described.

It is understood that the parts of the concentrator which come in contact with the solution, such as the air pervious members 54, 84, 86, 92, the rolls 52 and 38, the housing 12 and the hood 14, will be made of suitably resistant material. Thus, in one embodiment of the invention, the screen or perforate member may be formed of one or more layers of polyethylene or polypropylene formulation, such as Du Pont's Vexar plastic screen, preferably with quite a large unit surface area per unit projected area, as for example 9 square feet of surface for each square foot layer of projected area. It will be understood, of course that, all other factors being equal, the evaporative capacity per unit projected area is a direct function of the actual unit surface area. Thus, by using a double layer of the same Vexar screen, the evaporative capacity per unit projected area will be doubled, and so forth.

The following example is illustrative of the instant invention:

*Example*

The solution to be evaporated was contained at a controllable temperature in a 10-gallon rectangular tank. The screen member 54, 14¾" wide and formed into a cylinder, was carried on two 6" diameter cylinders 15" long. The lower cylinder was positioned beneath the liquid surface in the tank, and the upper cylinder was so positioned above it that the free screen height out of solution was 12". The screen was moved at a rate from about 40 to about 275 feet per minute, and the solution from the tank to the top of the descending side or flight 58 of the screen member was circulated at a rate from zero to about 0.3 gallon per minute. Air was blown through the screen by the two blowers 62 and 64, each of air capacity from 750 to 1150 cubic feet per minute. Both water and caustic soda solution were used in various runs. In the case of water, the evaporation rate was determined by careful measurement (to an estimated accuracy of 0.003 gallon) of the volume of water in the tank 10 before and after each run, and of the volume of water added. In the runs with caustic soda, the original and final concentrations in the tank were analytically determined, to give an accurate figure for the evaporation rate. Heat input to the system was supplied by the electric immersion heater 32 and the amount of heat was measured (in kilowatt-hours) by suitable ammeters and an accurate electric timer to indicate the fraction of the run duration during which the temperature control demanded heat input. The relative humidity and temperature of the ambient air in the laboratory were also recorded at the beginning and end of each run.

The following tables illustrate data obtained from the series of runs:

TABLE I.—CONDITIONS

| Run No. | Temp. of Sol'n in Tank, °F. | Air Flow, c.f.m. | Circulation Rate, g.p.m. | Screen Speed, f.p.m. | Sol'n Used | Relative Percent Humidity | | Room Temperature, °F. | |
|---|---|---|---|---|---|---|---|---|---|
| | | | | | | Before | After | Before | After |
| 1 | 130 | 750 | 0 | 40 | Water | 58 | 63 | 76 | 73 |
| 3 | 130 | 2,300 | 0.03 | 275 | do | 71 | 73 | 76 | 76 |
| 5 | 155 | 2,300 | 0 | 275 | 40 g./l. NaOH | 60 | 78 | 68 | 77 |
| 6 | 75 | 1,560 | 0 | 275 | 40 g./l. NaOH | 52 | 60 | 76 | 75 |

TABLE II.—RESULTS

| Run No. | Heat Input Rate, kwh. per hr. | Evaporation, gallons | Evaporation Rate, gal./hr. | Evaporation Rate, gal./sq. ft./hr. | Heat Input B.t.u./lb. Water Evaporated |
|---|---|---|---|---|---|
| 1 | 2.39 | 0.95 | 1.27 | 0.49 | 770 |
| 3 | 5.29 | 1.40 | 2.44 | 0.94 | 790 |
| 5 | 6.61 | 8.86 | 2.53 | 0.97 | 1,072 |
| 6 | 0.93 | 0.96 | 0.58 | 0.02 | 667 |

Thus, the present concentrator is superior to single-effect vacuum evaporators which generally require 1275 B.t.u./pound of water evaporator and compares favorably with double-effect vacuum evaporators which generally require 750 B.t.u./pound of water evaporated, yet the present concentrator is less expensive and has smaller operating costs per pound of water evaporated above that of the heat input required. In addition, the evaporation rates of the present concentrator are significantly greater than the rates attainable in pan evaporation.

The present invention is particularly useful in the plating and metal finishing industries which encounter considerable loss of valuable chemicals to waste. Economical recovery of these chemicals, generally lost in the rinse water, can be effected with a drag-out recovery tank. The successful operation of such a tank requires that the drag-out solution be withdrawn while its concentration is relatively low and that the total volume thereof be returned to the processing tank. Accordingly, the rate at which the volume in the processing tank decreases due to surface evaporation must equal or exceed that at which the drag-out solution is withdrawn from the drag-out tank. Most processing baths operate between room temperature and about 135° F. in which case the rate of bath evaporation is much less than the usual rate of withdrawal of drag-out solution. Thus, concentration of the drag-out solution is required before it can all be returned to the processing tank. The instant invention is especially well adapted for this because of its efficiency at relatively low temperatures.

Referring to FIG. 5 which illustrates this application, the carrier, i.e. rack or barrel, and the workpieces (not shown), properly prepared, rinsed and carrying a certain quantity of water per minute is introduced into a processing tank 94 containing a certain concentration of chemicals. After processing, the carrier and the workpieces are withdrawn from tank 94, now carrying a certain amount of the processing chemicals per minute, and immersed in a reclaim or drag-out tank 96 which was initially filled with water, but by reason of the continuing drag-out of chemicals from tank 94 will build up in concentration of said chemicals to some equilibrium concentration. To avoid return of diluted drag-out directly from drag-out tank 96 to processing or plating tank 94, the drag-out is withdrawn from tank 96 by means of a pump 98 which delivers it to the present concentrator 100, thence to a holding tank 102 and finally back to the processing tank 94 as demanded by a float control 104 in tank 94 which operates to open a normally closed solenoid valve 106. The concentrator 100 vaporizes water at a rate sufficient to produce a concentration in holding tank 102 which closely approaches the concentration in the processing tank 94. Thus, a substantially greater proportion of the chemicals normally lost are returned to the processing tank 94.

More sophisticated controls may be employed to carry out the objective of controllably feeding concentrated solution from the holding tank 102 to the processing tank 94 within a predetermined header range of high and low liquid levels in the processing tank. Thus a conventional three probe level control 108 may be provided in holding tank 102, which is operatively connected to a power source 110 and an alarm 112. A normally closed solenoid valve 114 is provided in a water feed line 116. When the level of solution in holding tank 102 reaches the upper probe of the control 108, alarm 112 goes off and the pump 98 is stopped. Otherwise, the pump runs continuously. When the level of liquid in the processing tank 94 drops to the low level of the range and at the same time the level of solution in the holding tank 102 falls below the lowest probe of the control 108, float valve 104 will cause valve 114 to open to thereby admit water to the processing tank 94. As soon as the level in the holding tank 102 is above the lowest probe of control 108, the solenoid valve 114 closes to shut off the supply of water to the processing tank so that the supply of water will only be enough to get the level in the processing tank quickly and safely above the low level of the operating header range. When the level in the holding tank 102 reaches the intermediate probe, which is preferably close to the lowest probe, valve 106 re-opens to admit concentrated solution to the processing tank. When the liquid in the processing tank reaches the upper level of the operating range, float control 104 will cause valve 106 to shut off and there will be no feed to the processing tank either of concentrated solution from the holding tank 102 or water from line 116.

While preferred embodiments of the invention have been shown and described herein, a skilled artisan may make minor variations without departing from the spirit of the invention and the scope of the appended claims.

We claim:

1. A concentrator comprising a vessel containing a solution, means to maintain the solution at a predetermined liquid level, means to heat the solution in said vessel, an air pervious member, means to move said air pervious member into and out of the solution, and means above the liquid level to blow relatively dry air through said air pervious member to effect evaporation of the solvent from the solution wetting said air pervious member, said air pervious member being an endless screen and said means to move it includes a pair of rotatable rolls over which said screen is trained, one of which is immersed in the solution and said vessel while the other is mounted outside the liquid level, and means to drive one of said rolls, said air blowing means including a blower opening upon each flight of said endless screen and a deflector between the flights to prevent conflict between the opposing air streams laden with evaporated vapor and direct the streams beyond the side edges of said screen to exhaust.

2. A concentrator comprising a collection vessel, a source of heated solution, of air pervious member, means to move said air pervious member above said vessel, a sprayer adjacent said air pervious member, means to pump the hot solution from said source through said sprayer to maintain said air pervious member wetted with said hot solution, and means to blow relatively dry air through said air pervious member to effect evaporation of the solvent from the solution wetting said air pervious member, said air pervious member being a vertically disposed endless screen and said air blowing means includes blowers opening upon the opposite flights of said screen, a deflector between said flight to prevent conflict between the opposing air streams laden with evaporated vapor and direct the streams beyond the screen to exhaust.

3. A concentrator comprising a vessel containing a solution, means to maintain the solution at a predetermined liquid level, means to heat the solution in said vessel, an endless air pervious member, means mounting said member for rotation above the liquid level with a lower portion thereof extending below the liquid level, a hood around said air pervious member communicating with a vent duct, means causing a stream of air to pass inwardly through opposite side portions of said member above the liquid level to effect evaporation of the solvent from the solution wetting said air pervious member, and means disposed inwardly of said air previous member acting to suppress conflict between the opposing air streams laden with evaporated vapor and direct the streams towards said vent duct.

References Cited
UNITED STATES PATENTS

| | | | |
|---|---|---|---|
| 170,484 | 11/1875 | Mason | 159—10 |
| 998,020 | 7/1911 | Mabee | 159—10 X |
| 1,079,669 | 11/1913 | Seltman | 159—8 |
| 2,524,753 | 10/1950 | Betts | 34—48 |
| 2,590,905 | 5/1952 | Homlinson et al. | 159—4 |
| 2,702,235 | 2/1955 | Hochmuth | 23—262 |
| 2,839,122 | 6/1958 | Laguiharre | 159—4 |
| 3,168,989 | 2/1965 | Heinemann | 241—3 |

FOREIGN PATENTS

| | | |
|---|---|---|
| 34,031 | 1/1886 | Germany. |
| 6,827 | 11/1897 | Norway. |
| 182,275 | 1/1963 | Sweden. |

NORMAN YUDKOFF, *Primary Examiner.*

J. SOFER, *Assistant Examiner.*